United States Patent
Polloni et al.

(10) Patent No.: US 11,427,397 B2
(45) Date of Patent: Aug. 30, 2022

(54) PACK FOR SMOKING ARTICLES PROVIDED WITH TWO RIGID CONTAINERS INSIDE ONE ANOTHER AND WITH A REUSABLE CLOSING TAB AND METHOD TO MANUFACTURE THE CLOSING TAB

(71) Applicant: G.D SOCIETA' PER AZIONI, Bologna (IT)

(72) Inventors: Roberto Polloni, Modigliana (IT); Luca Federici, Bologna (IT)

(73) Assignee: G.D SOCIETA' PER AZIONI, Bologna (IT)

( * ) Notice: Subject to any disclaimer, the term of this patent is extended or adjusted under 35 U.S.C. 154(b) by 209 days.

(21) Appl. No.: 16/868,589

(22) Filed: May 7, 2020

(65) Prior Publication Data

US 2020/0369458 A1    Nov. 26, 2020

(30) Foreign Application Priority Data

May 8, 2019   (IT) .................. 102019000006644

(51) Int. Cl.
  *B65D 85/10*   (2006.01)
  *B31B 50/00*   (2017.01)
  (Continued)

(52) U.S. Cl.
  CPC ...... *B65D 85/10564* (2020.05); *B31B 50/006* (2017.08); *B31B 50/0044* (2017.08);
  (Continued)

(58) Field of Classification Search
  CPC ........ B65D 85/10564; B65D 85/10568; B65D 5/18; B65D 5/643
  (Continued)

(56) References Cited

U.S. PATENT DOCUMENTS 3,251,972 A * 5/1966 Flygstad ............. H01H 13/023
                                                            200/324
8,123,030 B2 * 2/2012 Hein .................. B65D 75/5838
                                                            206/273
(Continued)

FOREIGN PATENT DOCUMENTS

EP    1803661 A1 * 7/2007 ............. B32B 1/00
EP    3251972 A1 * 12/2017 ............ B65D 5/543
(Continued)

OTHER PUBLICATIONS

Search Report and Opinion for Italian Patent Application No. 201900006644 dated Dec. 9, 2019.

*Primary Examiner* — Rafael A Ortiz
(74) *Attorney, Agent, or Firm* — Marshall, Gerstein & Borun LLP

(57) ABSTRACT

A pack for smoking articles having: an inner container housing a group of smoking articles and provided with an extraction opening for the smoking articles; a closing tab coupled to the inner container in the area of the extraction opening to close the extraction opening, the closing tab being glued to the inner container in a releasable manner; a rigid outer container that houses the inner container; and a cup-shaped lid hinged to the outer container so as to rotate, relative to the outer container, between an opening position and a closing position. The closing tab has: a plastic layer arranged internally, a through opening arranged in the area of the extraction opening, and directly glued to an outer (Continued)

surface of the inner container using re-stick glue; and a paper layer arranged in contact with the plastic layer and more on the outside than the plastic layer.

16 Claims, 12 Drawing Sheets

(51) Int. Cl.
| | |
|---|---|
| *B31B 50/62* | (2017.01) |
| *B32B 38/00* | (2006.01) |
| *B65D 5/18* | (2006.01) |
| *B65D 5/64* | (2006.01) |

(52) U.S. Cl.
CPC ............ *B31B 50/622* (2017.08); *B32B 38/00* (2013.01); *B65D 5/18* (2013.01); *B65D 5/643* (2013.01); *B32B 2307/748* (2013.01)

(58) Field of Classification Search
USPC .................................. 206/268, 274, 275, 245
See application file for complete search history.

(56) References Cited

U.S. PATENT DOCUMENTS

| | | | |
|---|---|---|---|
| 2015/0027916 A1* | 1/2015 | Buse | B65B 9/06 206/268 |
| 2015/0034509 A1* | 2/2015 | Seyfferth De Oliveira | B65D 85/10568 206/268 |
| 2015/0041346 A1* | 2/2015 | Seyfferth De Oliveira | B65D 85/1027 206/268 |
| 2015/0321831 A1* | 11/2015 | Ghini | B65D 85/10568 206/268 |
| 2015/0375923 A1* | 12/2015 | Pilzecker | B65D 85/1045 206/245 |
| 2019/0144197 A1* | 5/2019 | Bourgoin | B65D 85/10568 206/268 |

FOREIGN PATENT DOCUMENTS

| | | | | |
|---|---|---|---|---|
| WO | WO-2015150893 A1 * | 10/2015 | | B60C 25/0521 |
| WO | WO-2017036991 A  * | 3/2017 | | B65D 85/10 |
| WO | WO-2018/091408 A1 | 5/2018 | | |
| WO | WO-2018091408 A1 * | 5/2018 | | B32B 1/02 |

* cited by examiner

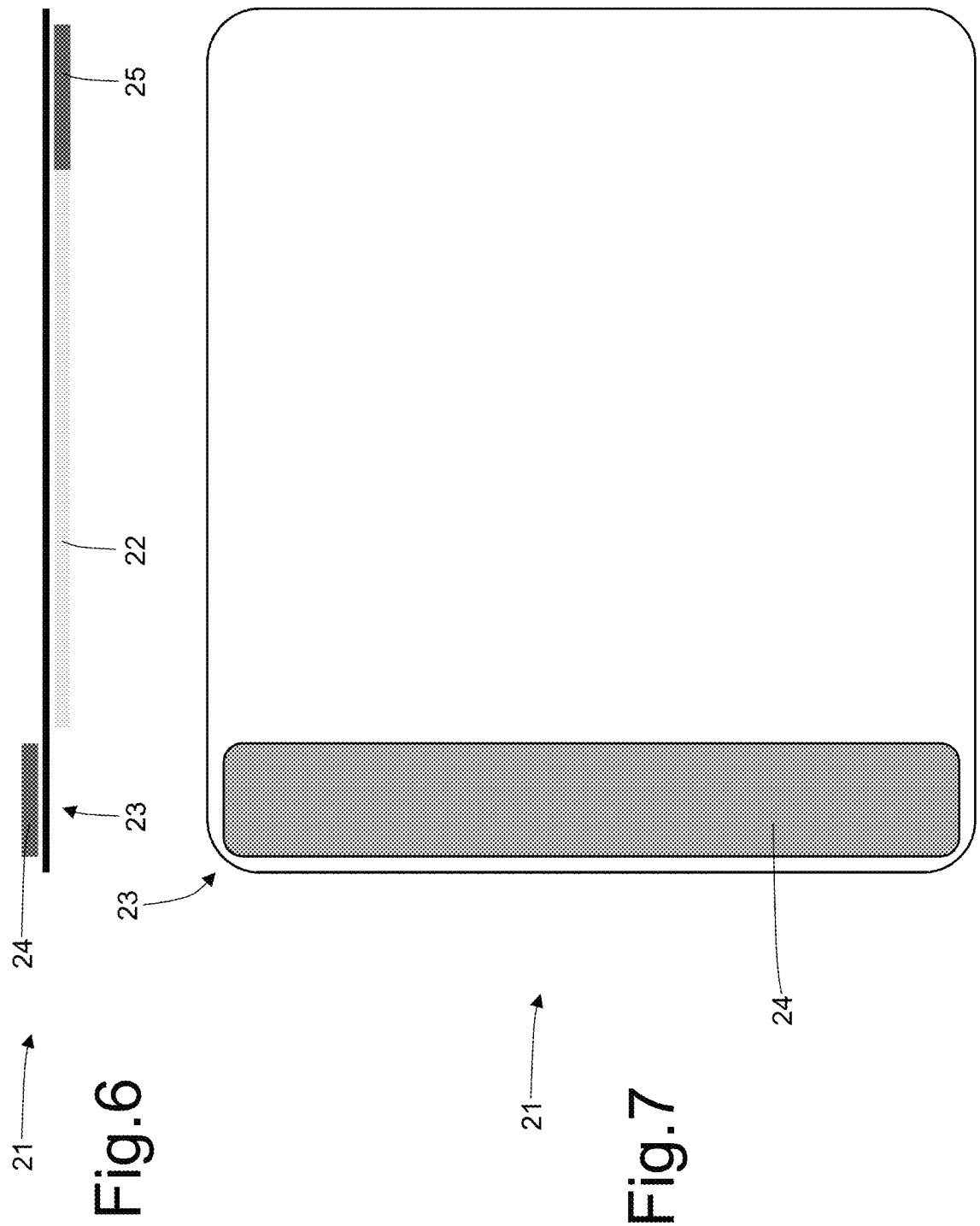

PACK FOR SMOKING ARTICLES PROVIDED WITH TWO RIGID CONTAINERS INSIDE ONE ANOTHER AND WITH A REUSABLE CLOSING TAB AND METHOD TO MANUFACTURE THE CLOSING TAB

CROSS-REFERENCE TO RELATED APPLICATIONS

This patent application claims priority from Italian patent application no. 102019000006644 filed on May 8, 2019, the entire disclosure of which is incorporated herein by reference.

TECHNICAL FIELD

The present invention relates to a pack for smoking articles provided with two rigid containers, one inside the other, and with a reusable closing tab and to a manufacturing method to manufacture a closing tab.

The present invention finds advantageous application to the manufacturing of a pack of cigarettes containing a group of cigarettes, to which the following disclosure will make explicit reference without thereby losing its generality.

PRIOR ART

In U.S. Pat. No. 8,123,030B2 a pack of cigarettes has been proposed comprising a group of cigarettes, a rigid inner container having a through extraction opening through which cigarettes can be extracted, and a rigid outer container which contains the inner container and is provided with a hinged lid; preferably, a closing tab is attached to the inner container, which is glued with re-stick glue to the inner container to cover the extraction opening.

In the patent U.S. Pat. No. 8,123,030B2 a packaging machine has also been proposed, which manufacture the pack of cigarettes described above and comprises: a first wrapping wheel having a vertical rotation axis (i.e. arranged horizontally) which receives a first blank and then the group of cigarettes and folds the first blank around the group of cigarettes to form the inner container, a first gluing unit which is arranged downstream of the first wrapping wheel and applies glue at opposite sides of the first container so as to stabilize the shape of the first container, a pair of first drying wheels arranged downstream of the first gluing unit to allow the glue to set, a second wrapping wheel having a vertical rotation axis (i.e. arranged horizontally) which receives a second blank and then the inner container and folds the second blank around the inner container so as to form the outer container (thus completing the manufacturing of the pack of cigarettes), a second gluing unit which is arranged downstream of the second wrapping wheel and applies glue at opposite sides of the second container to stabilize the shape of the second container, and a pair of second drying wheels arranged downstream of the second gluing unit to allow the glue to set.

Patent application WO2018091408A1 describes a pack for smoking articles of the "self-opening" type and comprising a rigid outer container with a hinged lid, and a sealed inner container provided with a closing tab glued to an inner surface of the lid.

DESCRIPTION OF THE INVENTION

The object of the present invention is to provide a pack for smoking articles provided with two rigid containers, one inside the other, and with a reusable closing tab and a manufacturing method to manufacture a closing tab, which pack for smoking articles allows to better preserve the integrity of the smoking articles and, at the same time, is easy and inexpensive to manufacture.

According to the present invention, a pack for smoking articles is provided with two rigid containers, one inside the other, and with a reusable closing tab and a manufacturing method to manufacture a closing tab, as claimed in the attached claims.

The claims describe preferred embodiments of the present invention forming an integral part of the present description.

BRIEF DESCRIPTION OF THE DRAWINGS

The present invention will now be described with reference to the attached drawings, which illustrate a non-limiting example of embodiment, wherein:

FIG. 6 is a schematic and lateral view of a closing tab coupled to the inner container of FIG. 4;

FIG. 7 is a schematic view of an outer wall of the closing tab of FIG. 6;

PREFERRED EMBODIMENTS OF THE INVENTION

Figure 2:
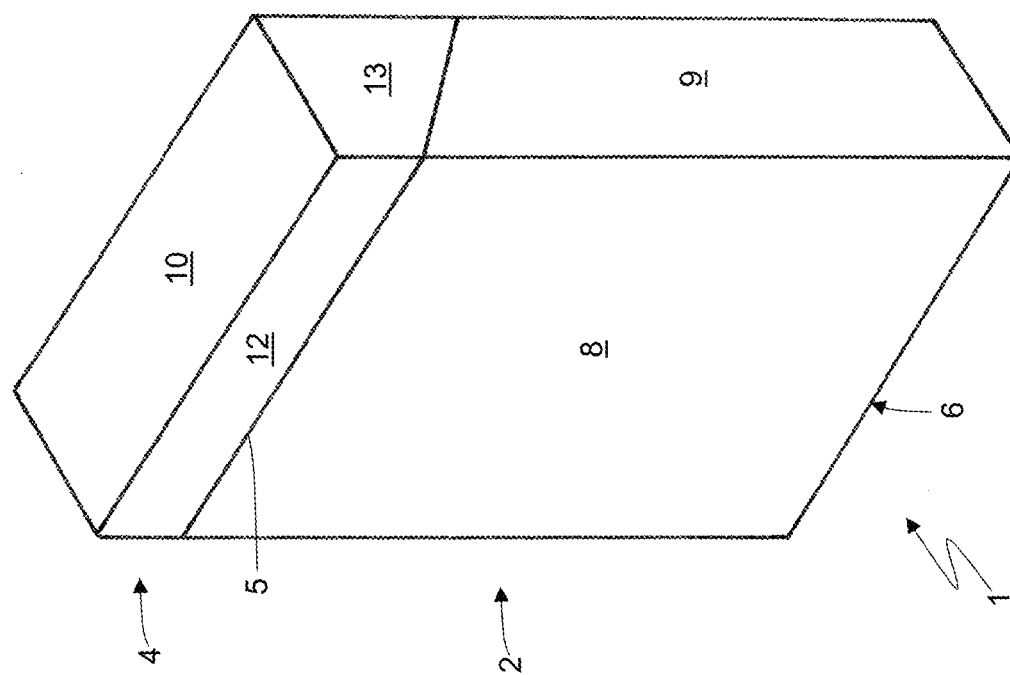
FIG. 2 is a rear perspective view of the pack of cigarettes of FIG. 1 in a closed configuration.
Figure 1:
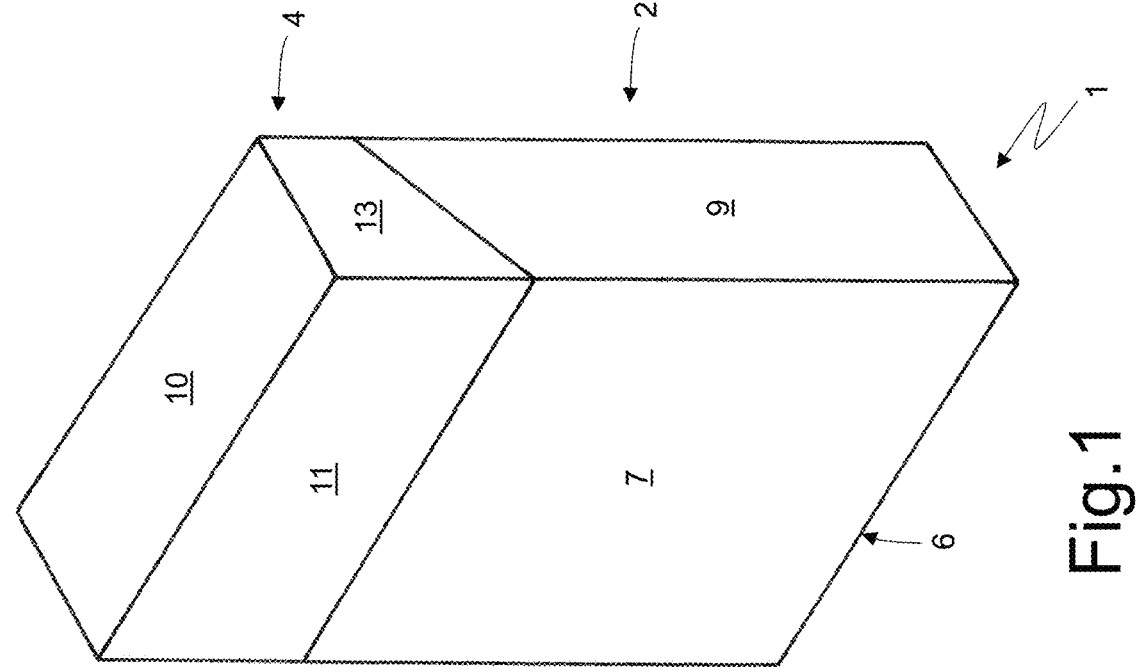
FIG. 1 is a front perspective view and in a closed configuration of a pack of cigarettes provided with two rigid containers, one inside the other.
Figure 3:
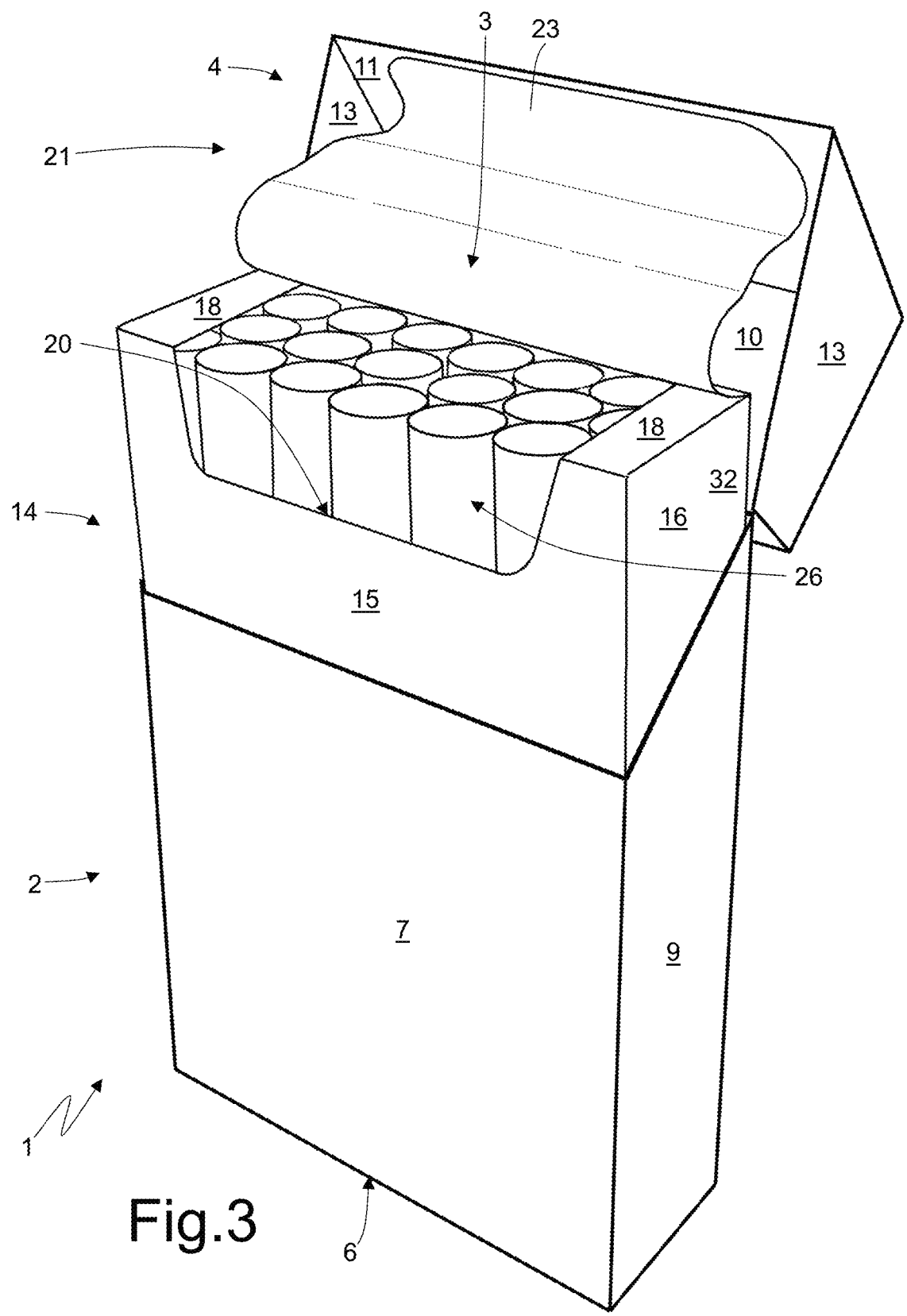
FIG. 3 is a front perspective view of the pack of cigarettes of FIG. 1 in an open configuration.

In FIGS. 1, 2 and 3 number 1 denotes, as a whole, a rigid pack of cigarettes. The pack 1 of cigarettes comprises an outer container 2 made of a cup-shaped cardboard or rigid paperboard.

The outer container 2 has an open upper end 3 and is provided with a lid 4, which is cup-shaped and is hinged to the outer container 2 along a hinge 5 (illustrated in FIG. 2) so as to rotate, relative to the outer container 2, between an opening position (illustrated in FIG. 3) and a closing position (illustrated in FIGS. 1 and 2) of the open upper end 3. The outer container 2 has a substantially rectangular parallelepiped shape oriented in a prevalently vertical development direction, is cup-shaped, and has the open upper end 3, a lower wall 6 opposite the open upper end 3, a front wall 7 and a rear wall 8 (in which the hinge 5 is obtained) parallel and opposite to one another, and two side walls 9 parallel and opposite to one another. Four longitudinal edges are defined between the front 7, rear 8 and side walls 9 of the outer container 2, whereas four transverse edges are defined between the walls 7, 8 and 9 and the lower wall 6 of the outer container 2.

The lid 4 has a substantially rectangular parallelepiped shape, is cup-shaped, and has an open lower end (facing the open upper end 3 of the outer container 2 when the lid 4 is in the closing position), an upper wall 10 (which is parallel and opposite to the lower wall 6 of the outer container 2 when the lid 4 is in the closing position), a front wall 11 (which is parallel to and aligned with the front wall 7 of the outer container 2 when the lid 4 is in the closing position), a rear wall 12 (which is parallel to and aligned with the rear wall 8 of the outer container 2 when the lid 4 is in the closing position and is hinged to the rear wall 8 of the outer container 2 along the hinge 5), and two side walls 13 parallel and opposite to one another (which are parallel and aligned, in particular coplanar and adjacent, to the side walls 9 of the container 2 when the lid 4 is in the closing position). Four longitudinal edges are defined between the front 11, rear 12 and lateral 13 walls of the lid 4, whereas four transverse edges are defined between the walls 11, 12 and 13 and the upper wall 10 of the lid 4. The longitudinal and transverse edges of the lid 4 are parallel to and aligned with the corresponding longitudinal and transverse edges of the outer container 2 when the lid 4 is in the closing position.

Figure 4:
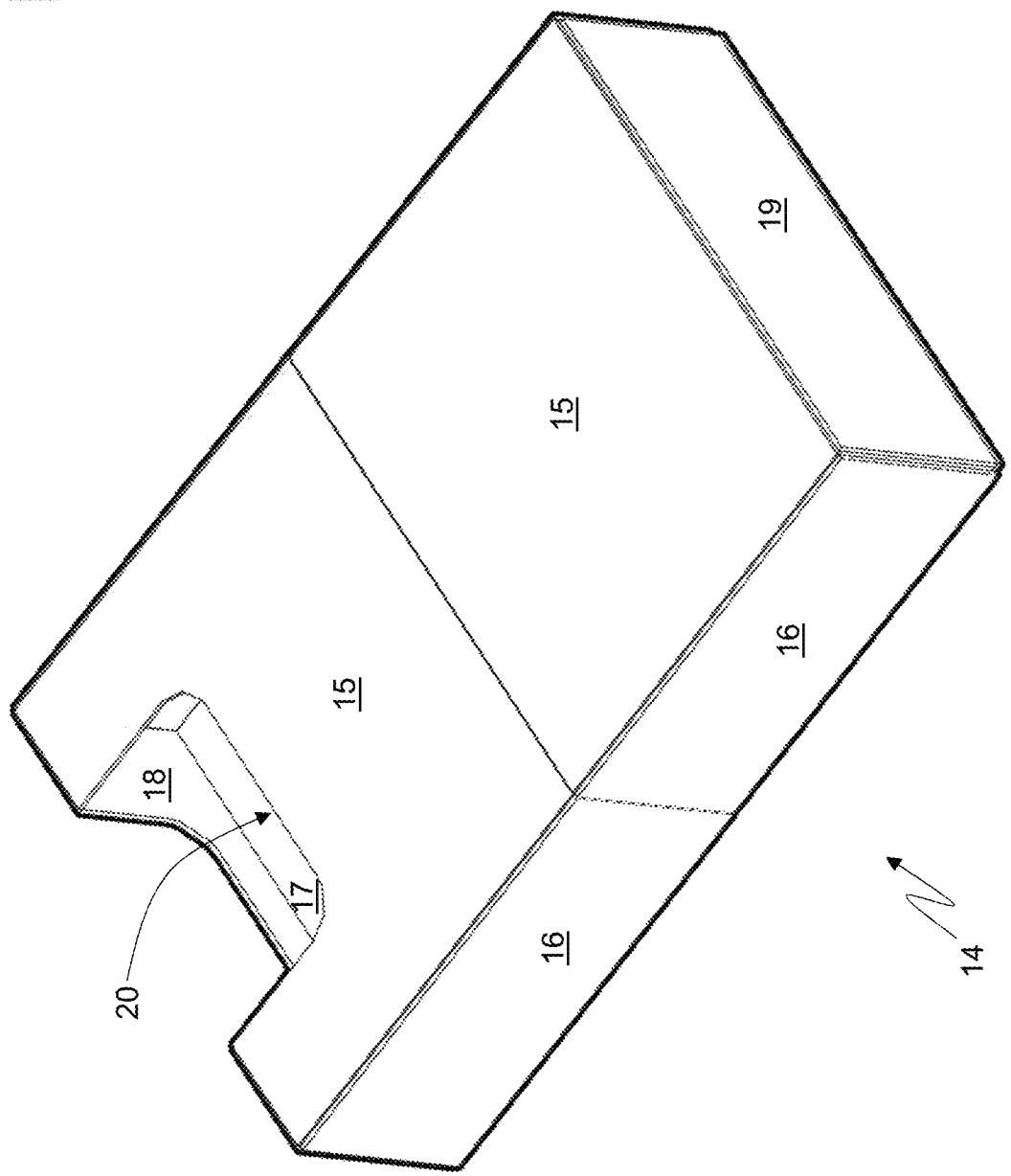
FIG. 4 is a front perspective view of an inner container of the pack of FIG. 1.

As illustrated in FIGS. 3 and 4, the pack 1 of cigarettes comprises an inner container 14, which is fixed (normally by gluing) on the inside of the outer container 2 to partially protrude outside the open upper end 3 and engage a corresponding inner surface of the lid 4 when the lid 4 is arranged in the aforementioned closing position. The inner container 14 comprises a front wall 15, which is parallel to and rests against the front wall 7 of the container 2, two lateral walls 16 which are folded by 90° relative to the front wall 15 and are parallel to and rest against the lateral walls 9 of the container 2, a rear wall 17 which is folded by 90° relative to the side walls 16, is parallel to the front wall 15, and is parallel, rests against and is glued to the rear wall 8 of the container 2, an upper wall 18 which is perpendicular to the walls 15, 16 and 17, and a lower wall 19 which is parallel and opposite to the upper wall 18, is perpendicular to the walls 15, 16 and 17, and is parallel to and rests against the lower wall 6 of the container 2.

The inner container 14 also has the function of keeping the lid 4 in the closing position with a given force to avoid undesired openings of the lid 4; said "locking" function of the lid 4 in the closing position is carried out thanks to the fact that when the lid 4 is in the closing position the inner container 14 partially protrudes from the open end of the container 2 and thus engages a corresponding inner surface of the lid 4: in this way, to open the lid 4 it is necessary to elastically and slightly deform the lid 4 and/or the inner container 14 and therefore it is necessary to apply a given force to the lid 4 to open the lid 4.

The inner container 14 has an extraction opening 20, which is arranged centrally and involves a portion of the front wall 15 of the inner container 14 and a portion of the upper wall 18 of the inner container 14. The extraction opening 20 is obtained by making a closed-shaped through incision through the inner container 14 which delimits, on the inside thereof, a disposable portion of the inner container 14 which is eliminated so as to leave a hole (which forms the extraction opening 20).

As illustrated in FIG. 3, the extraction opening 20 of the inner container 14 is normally closed by a reusable closing tab 21 which is fixed to the inner container 14 by means of re-stick glue 22 (schematically illustrated in FIG. 6) which is arranged around the extraction opening 20 to allow the closing tab 21 to be, several times (i.e. at each opening of the pack 1 of cigarettes) partially separated from the inner container 14 and then again fixed to the inner container 14 (at each closing of the pack 1 of cigarettes). In other words, the re-stick glue is a glue that does not dry after its application and therefore allows the separation and subsequent re-adhesion of the closing tab 21 to the underlying inner container 14 several times.

The closing tab 21 is provided with a control flap 23, which is devoid of the re-stick glue 22 and is glued in a permanent and non-separable manner to the inner surface of the front wall 11 of the lid 4 by means of non-separable glue 24 (i.e. permanent and schematically illustrated in FIGS. 6 and 7) which is applied to the outer surface of the closing tab 21 (i.e. the surface of the closing tab 21 facing outwards, i.e. from the opposite wall of the inner container 14); in other words, the control flap 23 is internally devoid of the re-stick glue 22 and is externally provided with the non-separable glue 24. In this way, by opening or closing the lid 4 simultaneously, the closing tab 21 is also opened and closed. According to a different embodiment not illustrated, the control flap 23 is devoid of the non-separable glue 24 and therefore is not glued in a permanent and non-separable manner to the front wall 11 of the lid 4; in this embodiment, the control flap 23 is still internally devoid of the re-stick glue 22 and can be grasped by the user to manually lift the closing tab 21 once the lid 4 has been opened.

In the (non-limiting) embodiment illustrated in FIG. 6, the inner surface of the closing tab 21 (i.e. the surface of the closing tab 21 facing inward, i.e. on the same side of the inner container 14) is glued in a separable manner to the outer surface of the inner container 14 by means of the re-stick glue 22 and is glued in a non-separable manner to the outer surface of the inner container 14 by means of non-separable (i.e. permanent) glue 25.

Figure 5:
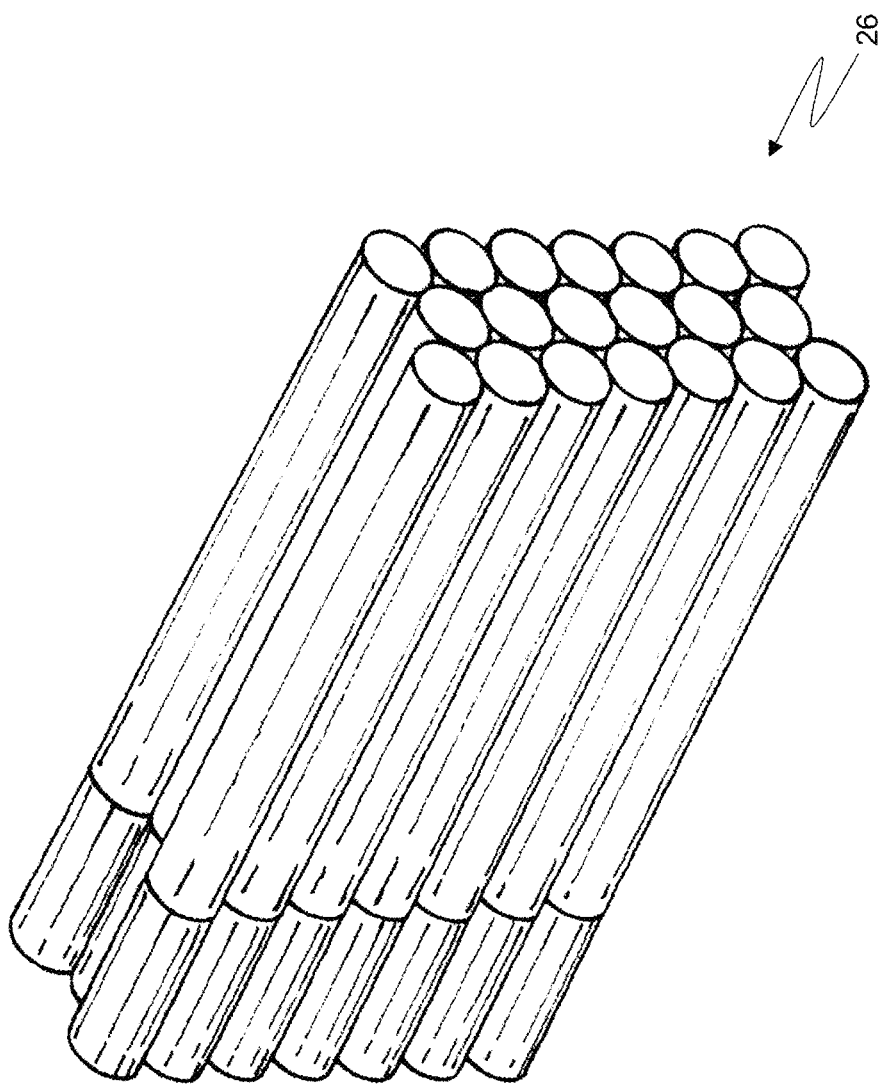
FIG. 5 is a perspective view of a group of cigarettes contained in the inner container of FIG. 4.

As illustrated in FIG. 3, group 26 of cigarettes (illustrated in its entirety in FIG. 5) is arranged inside the inner container 14. According to the embodiment illustrated in the attached Figures, the group 26 of cigarettes is devoid of inner wrap and is in direct contact with the inner container 14; i.e. the group 26 of cigarettes is "denuded" and therefore it is completely devoid of an inner wrap surrounding the same and is inserted into the inner container 14 exactly as illustrated in FIG. 5. According to a different embodiment not illustrated, the group 26 of cigarettes is wrapped in an inner wrap that is cup-shaped, leaves completely in sight the upper part of the cigarettes (i.e. the filters of the cigarettes) and is therefore "invisible" from the outside of the inner container 14; according to a further embodiment not illustrated, the group 26 of cigarettes is wrapped in an inner wrap which completely covers the group 26 of cigarettes and is provided with a removable upper portion (the so-called "pull") which must be removed at the first opening pack 1 of cigarettes.

Figure 8:
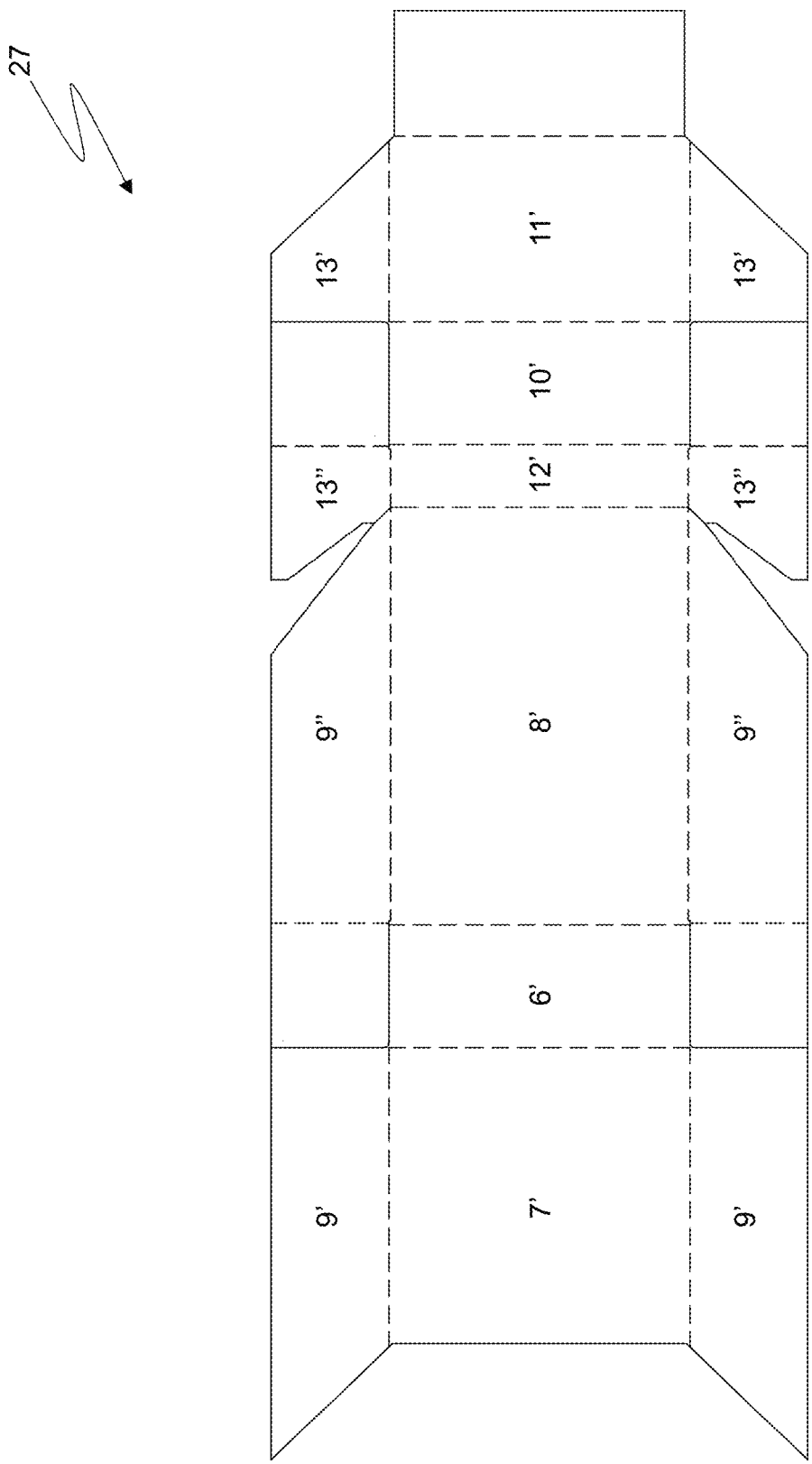
FIG. 8 is a plan view of a blank used to make an outer container provided with a hinged lid of the pack of cigarettes FIG. 1.

As illustrated in FIG. 8, the outer container 2 and the lid 4 are made by folding a blank 27 of a known type.

Figure 9:
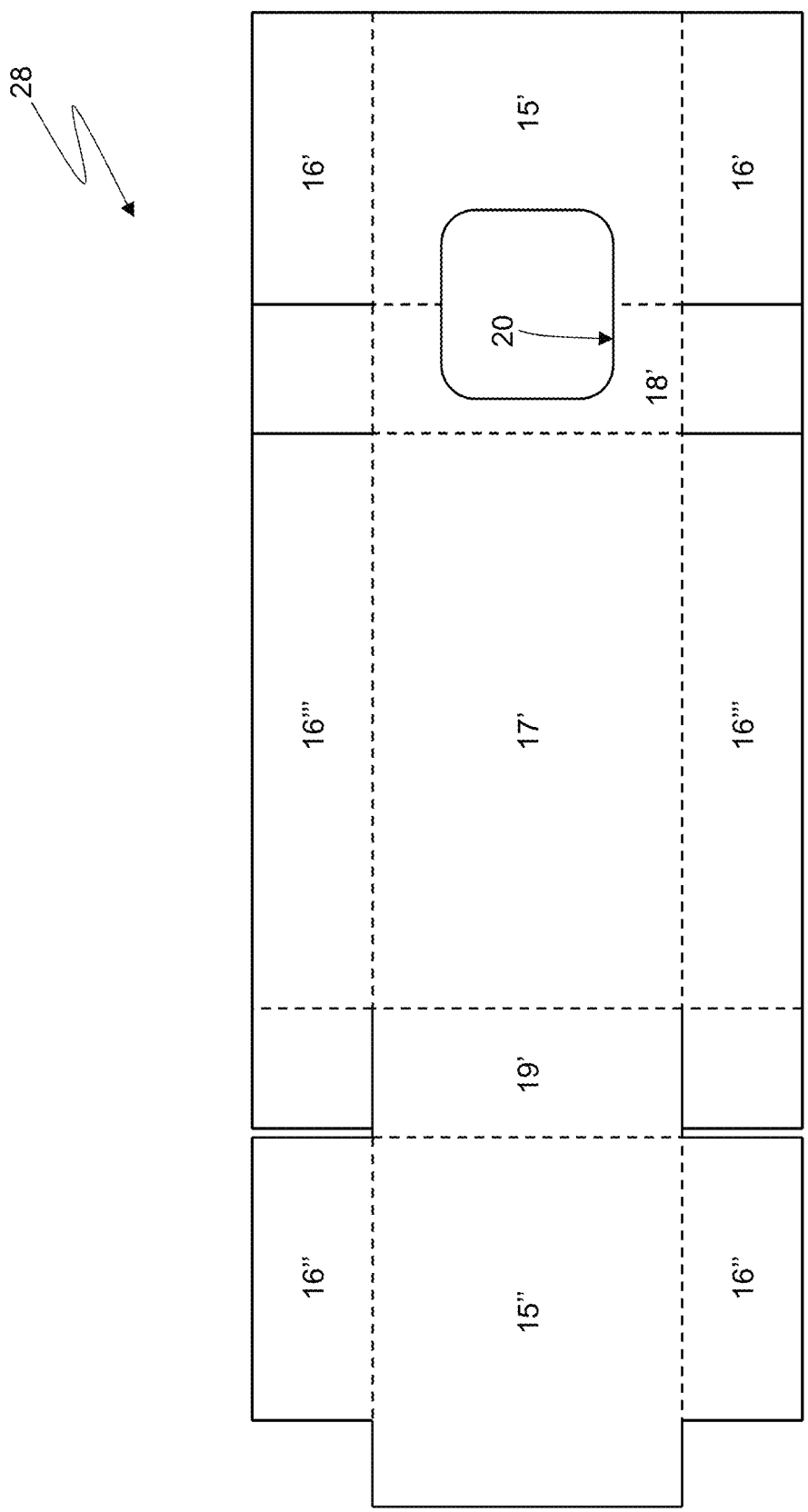
FIG. 9 is a plan view of a blank used to make the inner container of FIG. 4.
Figure 12:
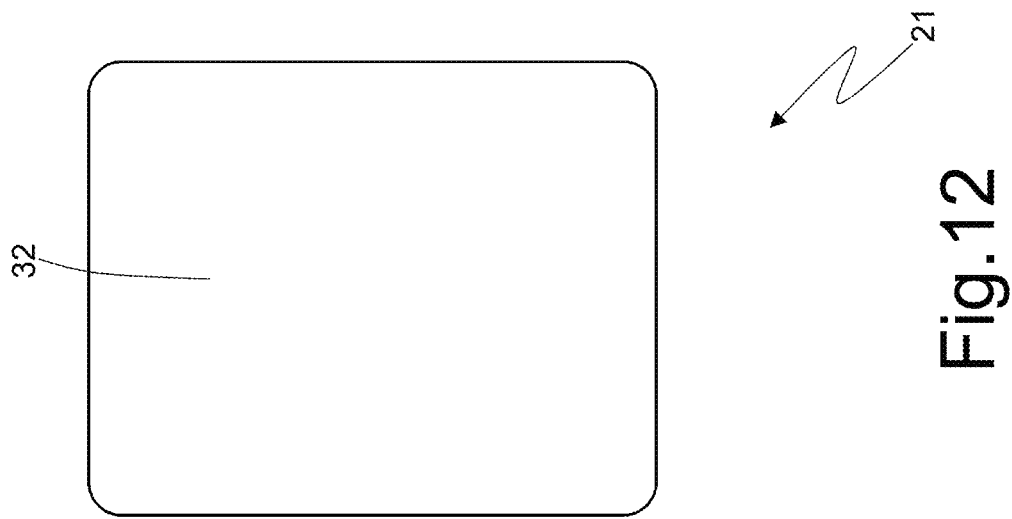
FIG. 12 is a schematic view of an outer wall of the closing tab of FIG. 6.

As illustrated in FIG. 9, the inner container 14 is made by folding a blank 28 of a known type.

As illustrated in FIGS. 10-18, the closing tab 21 comprises four layers 29, 30, 31 and 32 overlapping one another;

in particular, the closing tab 21 comprises a plastic layer 29 arranged internally (i.e. directly glued to the outer surface of the inner container 14 by means of the re-stick glue 22 and the non-separable glue 24) on which the re-stick glue 22 and the non-separable glue 24 are applied, a paper layer 30 which is fixed (glued) to the plastic layer 29 and is arranged more on the outside (i.e. further away from the inner container 14) than the plastic layer 29, a metal layer 31 (typically made of aluminium) which is fixed (mechanically) to the paper layer 30 and is arranged more on the outside (i.e. further away from the inner container 14) than the paper layer 30 and a plastic layer 32 which is fixed (glued) to the metal layer 31 and is arranged more on the outside (i.e. further away from the inner container 14) than the metal layer 31. In other words, the layer 30 is arranged in contact with the plastic layer 29 and on an outer side of the plastic layer 29 opposite an inner side of the plastic layer 29 glued to the outer surface of the inner container 14 (i.e. provided with the re-stick glue 22).

According to a preferred embodiment, the layers 29 and 30 are connected to one another (i.e. made integral) by means of a non-separable (permanent) glue, i.e. non-separable glue is interposed between the layers 29 and 30; similarly, the layers 31 and 32 are connected to one another (i.e. made integral) by means of a non-separable (permanent) glue, i.e. non-separable glue is interposed between the layers 31 and 32. Whereas, the layers 30 and 31 are generally mechanically coupled to one another (by means of compression exerted by at least two rollers between which have passed the two layers 30 and 31) without the interposition of glue.

According to a possible embodiment, the plastic layer 29 is made of PP (polypropylene) and has a thickness of about 10-20 microns (preferably 15 microns), the paper layer 30 is made of a paper having a basis weight of 30-40 grams/m$^2$ (preferably 35 grams/m$^2$) and has a thickness of 45-75 microns (preferably 60 microns), the metal layer 31 is made of aluminium and has a thickness of 5-7 microns (preferably 6.3 microns), and the plastic layer 32 is made of PET (polyethylene terephthalate) and has a thickness of about 25-35 microns (preferably 30 microns).

The internally arranged plastic layer 29 has a through opening 33 (i.e. a hole) which is arranged in the area of the cigarette extraction opening 20 and preferably has a size slightly greater than the size of the cigarette extraction opening 20 to ensure that the cigarettes can always and only come into contact with the paper layer 30 through the through opening 33 and can never come into contact with the plastic layer 29 even in the event of incorrect positioning (due to inevitable construction and manufacturing tolerances) of the closing tab 21 relative to the extraction opening 20 obtained in the inner container 14. As an example, the through opening 33 could be wider than the cigarette extraction opening 20 of 1-3 mm per side. For the same reason, the re-stick glue 22 could be kept at a given distance (for example 1-3 mm per side) from the edge of the through opening 33 to prevent the re-stick glue 22 from accidentally coming into contact with the cigarettes.

As previously mentioned, in the area of the control flap 23 the closing tab 21 is devoid of re-stick glue 22. According to a possible embodiment not illustrated, in order to achieve this result, the re-stick glue 22 is not exactly applied on the closing tab 21 in the area of the control flap 23; alternatively, according to a different embodiment illustrated in FIGS. 10, 11 and 13, in order to achieve this result, the re-stick glue 22 is at first, applied on the closing tab 21 also in the area of the control flap 23 and subsequently the re-stick glue 22, which is in the area of the control flap 23 is neutralized (i.e. made completely ineffective as if it were absent) by covering it with a neutralizing paint 34.

Figure 11:
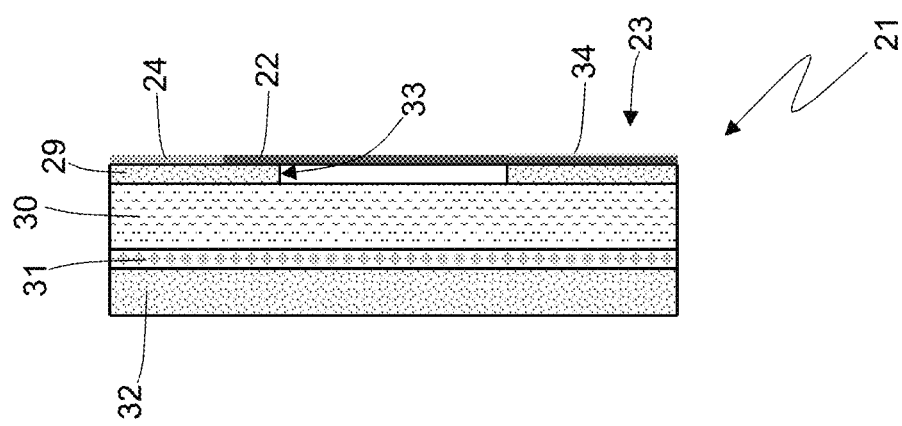
FIG. 11 is a schematic view in longitudinal section of the closing tab of FIG. 6.
Figure 10:
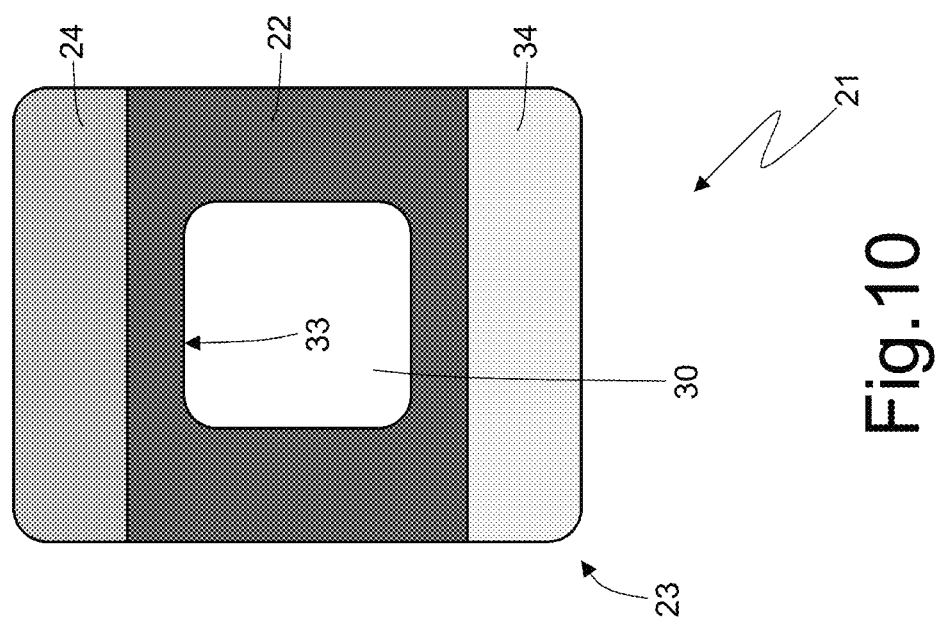
FIG. 10 is a schematic view of an inner wall of the closing tab of FIG. 6.
Figure 13:
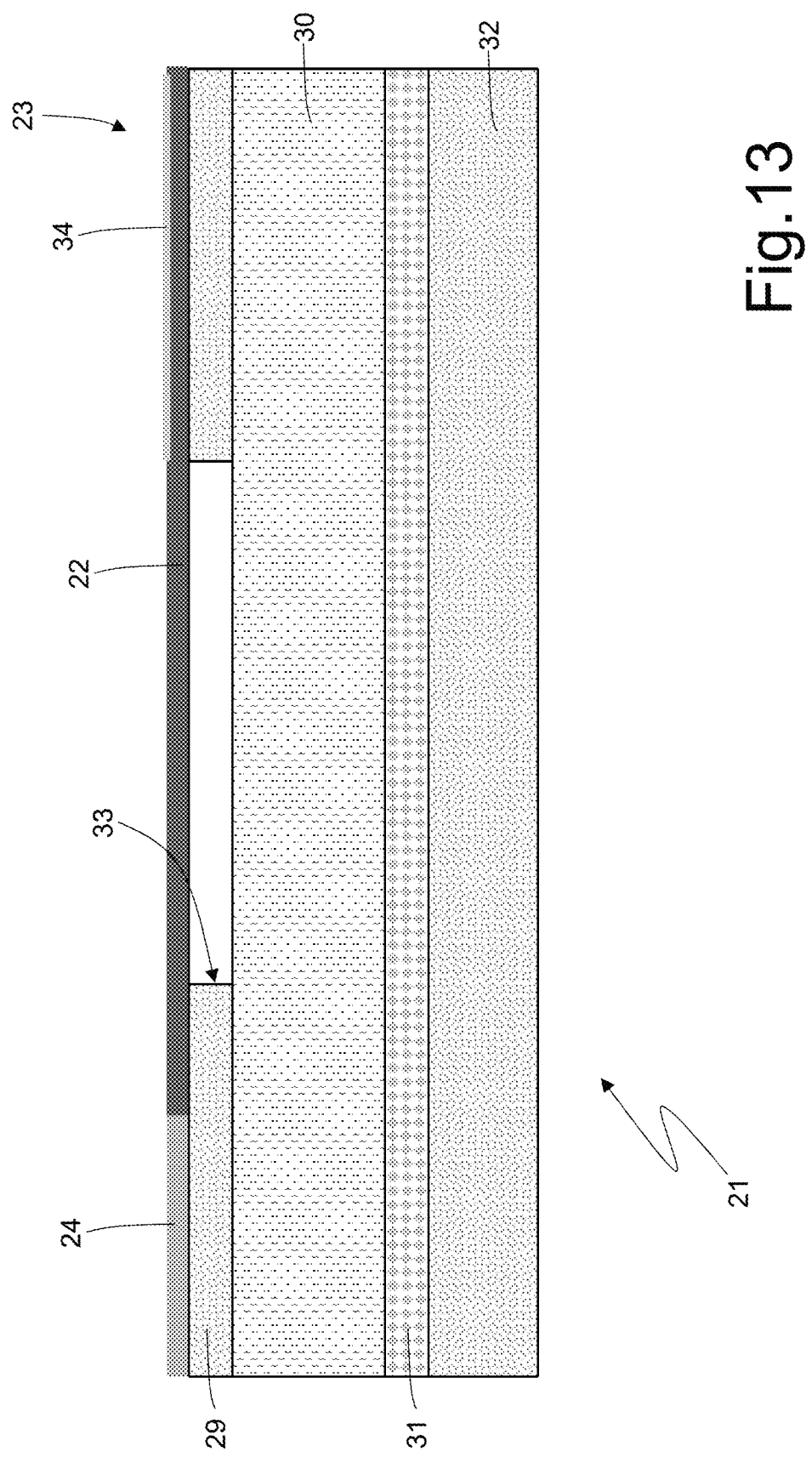
FIG. 13 is an enlarged view of a part of FIG. 11.
Figure 14:
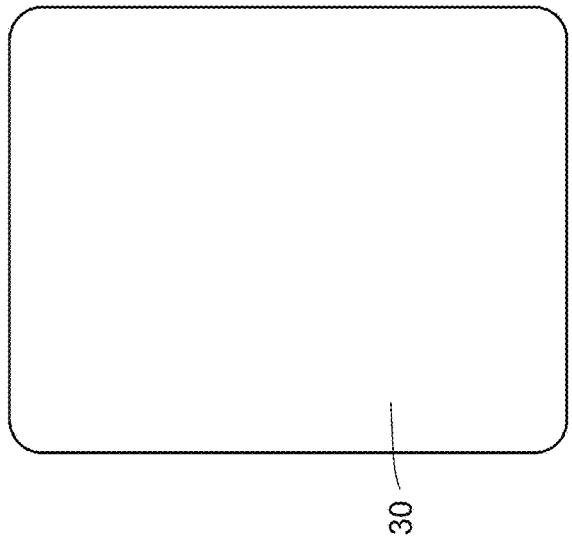
FIGS. 14-17 are four plan views of respective layers of the closing tab of FIG. 6.
Figure 15:
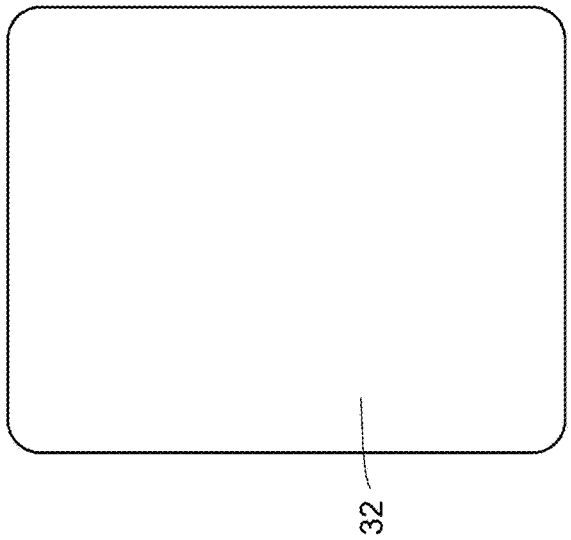
Figure 16:
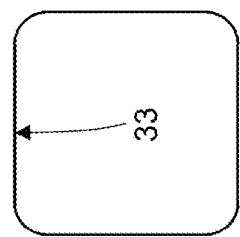
Figure 17:
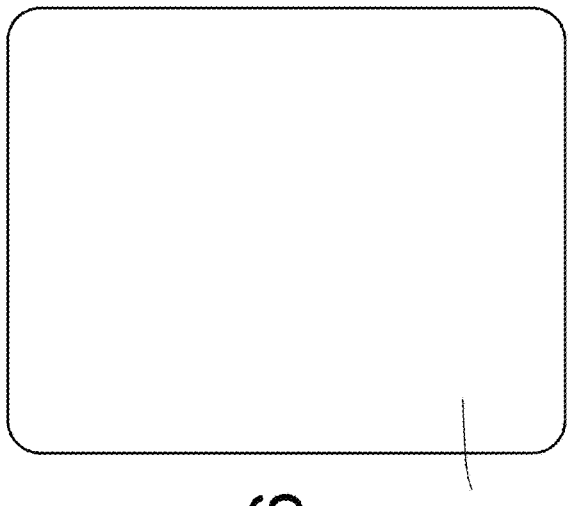
Figure 18:
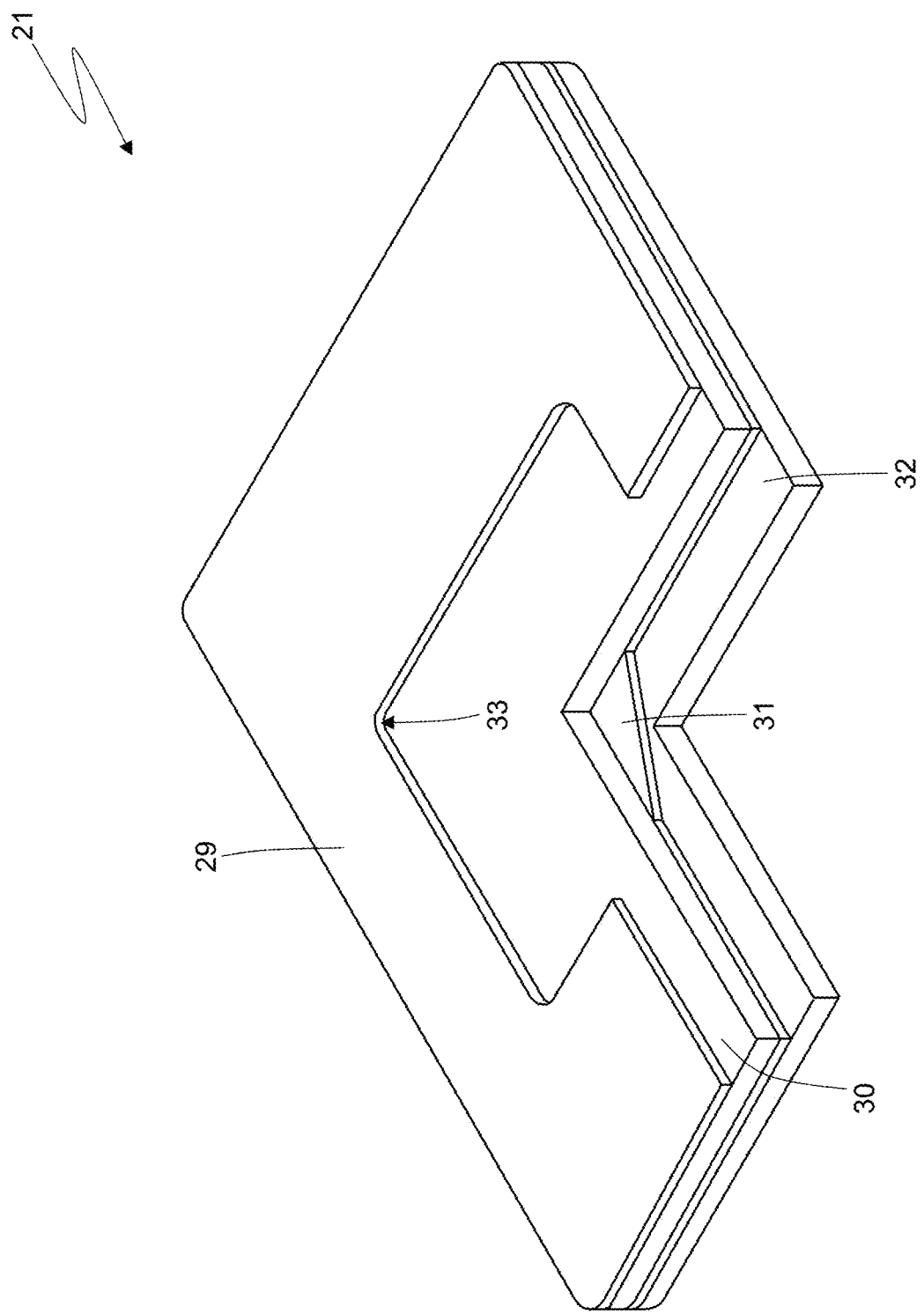
FIG. 18 is a perspective and partially sectioned view of the closing tab of FIG. 6.

In the embodiment illustrated in FIGS. 10, 11 and 13, the non-separable glue 24 is applied in place of the re-stick glue 22 where the re-stick glue 22 has not been previously applied; according to a different embodiment not illustrated, the non-separable glue 24 is applied over the re-stick glue 22 applied previously.

The function of the plastic layer 32 is essentially to stiffen the closing tab 21 as a whole; in addition, the plastic layer 32 could also protect a print made (often in relief) on the metal layer 31 (and in this case the plastic layer 32 could be transparent).

According to a different embodiment not illustrated, the closing tab 21 comprises only three layers 29, 30 and 31, i.e. the plastic layer 32 is absent.

According to a different embodiment not illustrated, a further plastic layer is provided which is permanently glued (i.e. by means of a non-separable glue) to the outer surface of the inner container 14 and around the extraction opening 20: the re-stick glue 22 is interposed between this further plastic layer (which in all respects is a coating surface of the inner container 14 and therefore functionally belongs to the inner container 14) and to the plastic layer 29; at first, this further plastic layer can be part of the closing tab 21 in order to be permanently glued to the outer surface of the inner container 14 when the closing tab 21 is applied to the inner container 14.

Figure 19:
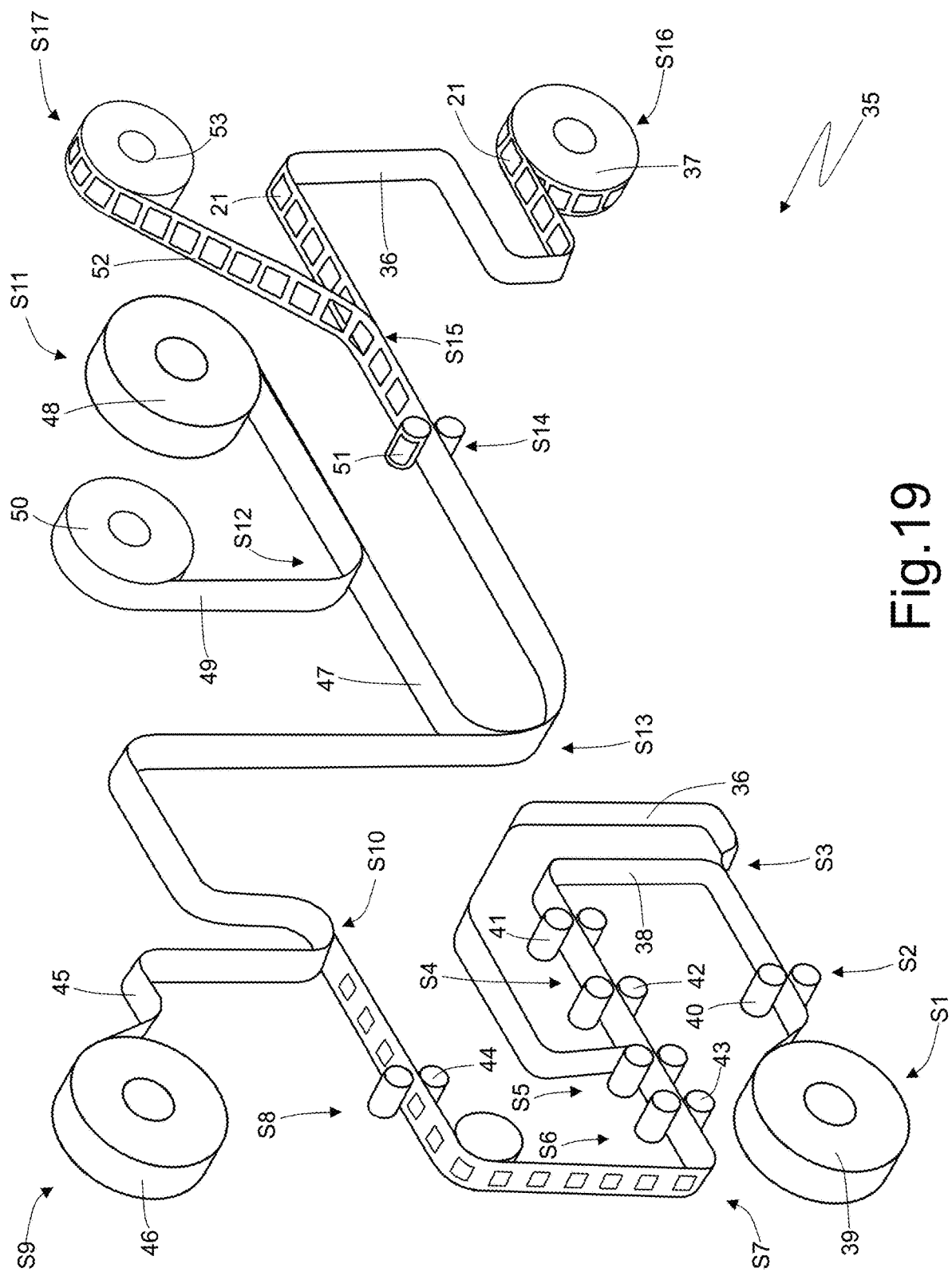
FIG. 19 is a schematic view of a production plant for the production of the closing tab of FIG. 6.

In FIG. 19, number 35 denotes as a whole a production plant for the production of the closing tabs 21 described above which, once produced, are coupled to a silicone-coated support tape 36 which is wound to form a reel 37.

The production plant 35 comprises an unwinding station S1 in which a tape 38 of plastic material (which will form the plastic layer 29) is unwound from a reel 39; the tape 38 of plastic material is adhesive (already glued), or is already provided on one side (at first, facing downwards in FIG. 19) with the re-stick glue 22, which completely and uniformly covers the whole side. In order to be wound in the reel 39, the tape 38 of plastic material (provided with the re-stick glue 22) is coupled to (overlapping) the silicone-coated support tape 36 (which obviously engages the side provided with the re-stick glue 22).

Downstream of the unwinding station S1 a printing station S2 is provided, in which the tape 38 of plastic material (still coupled to the tape 38 of plastic material) is passed through a printing device 40 which cyclically makes, on the tape 38 of plastic material, centring notches for the register of all subsequent operations (usually each centring notch is placed in a position which will then correspond to the space between two closing tabs 21).

Downstream of the printing station S2, the tape 38 of plastic material is passed through a decoupling (separation) station S3, in which the tape 38 of plastic material is decoupled (separated) from the silicone-coated support tape 36 placing in sight the side provided with the re-stick glue 22 (no longer covered by the silicone-coated support tape 36).

Downstream of the uncoupling station S3, the tape 38 of plastic material (separated from the silicone-coated support tape 36) is passed through an application station S4, in which an applicator device 41 applies the neutralizing paint 34 over the re-stick glue 22 and subsequently an applicator device 42 applies the non-separable glue 25 over the re-stick glue 22.

Downstream of the application station S4, the tape 38 of plastic material (separated from the silicone-coated support tape 36) is passed through a coupling station S5, in which the tape 38 of plastic material is again coupled to (overlapping) the silicone-coated support tape 36 previously separated in the uncoupling station S3; the silicone-coated support tape 36 obviously rests against the side of the tape 38 of plastic material provided with the re-stick glue 22.

Downstream of the coupling station S5 an incision station S6 is provided, in which the tape 38 of plastic material (again coupled to the silicone-coated support tape 36) is passed through an incision device 43 which cyclically makes the through openings 33; the incision device 43 makes a kiss-cut incision by touching the silicone-coated support tape 36.

Downstream of the incision station S6, the tape 38 of plastic material (again coupled to the silicone-coated support tape 36) is passed through a waste station S7, in which the waste of the through openings 33 (i.e. the plastic material which is internally located at the through openings 33) are removed and eliminated (for example by means of a pneumatic aspirator which detaches the waste of the through openings 33).

Downstream of the waste station S7, a gluing station S8 is provided, in which the tape 38 of plastic material (coupled with the silicone-coated support tape 36) is passed through a gluing device 44 which applies a non-separable glue on the face of the tape 38 of plastic material opposite the re-stick glue 22 (therefore opposite to the silicone-coated support tape 36); the gluing device 44 applies the non-separable glue keeping the non-separable glue at a given distance (for example 1-3 mm) from each through opening 33 to prevent the non-separable glue from overflowing from the through opening 33 due to the construction tolerances.

The production plant 35 comprises an unwinding station S9 in which a metallized paper tape 45 (which will form both the paper layer 30 and the metal layer 31) is unwound from a reel 46.

Downstream of the gluing station S8, the tape 38 of plastic material (coupled to the silicone-coated support tape 36) is passed through a coupling station S10 in which the tape 38 of plastic material is coupled to (overlapping) the metallized paper tape 45 previously unwound in the unwinding station S9 thus determining the gluing of the tape 38 of plastic material to the metallized paper tape 45.

The production plant 35 comprises an unwinding station S11, in which a tape 47 of plastic material (which will form the plastic layer 32) is unwound from a reel 48; the tape 47 of plastic material is adhesive (already glued), i.e. it is already provided, on one side, (at first, facing upwards in FIG. 19) with a non-separable glue that completely and uniformly covers the whole side. In order to be wound in the reel 48, the tape 47 of plastic material (provided with the non-separable glue) is coupled to (overlapping) a silicone-coated support tape 49.

Downstream of the unwinding station S11, the tape 38 of plastic material is passed through a decoupling (separation) station S12 in which the tape 47 of plastic material is decoupled (separated) from the silicone-coated support tape 49 placing in sight the side provided with non-separable glue (no longer covered by the silicone-coated support tape 48); downstream of the uncoupling station S12 the silicone-coated support tape 49 is wound by in a new reel 50 to be reused later.

Downstream of the coupling station S10, the tape 38 of plastic material (coupled to the silicone-coated support tape 36 and to the metallized paper tape 45) is passed through a coupling station S13 in which the metallized paper tape 45 is coupled to (overlapping) the tape 47 of plastic material previously unwound in the unwinding station S11 to which it adheres by gluing.

Downstream of the coupling station S13, a trimming station S14 is provided, in which the tape 38 of plastic material (coupled to the silicone-coated support tape 36, to the metallized paper tape 45, and to the tape 47 of plastic material) is made passing through a trimming device 51 which cuts (trims) the final shape of the closing tabs 21 from the tapes 38, 45 and 47; the trimming device 51 makes a kiss-cut incision by touching the silicone-coated support tape 36.

Downstream of the cutting station S14, the silicone-coated support tape 36 (coupled to the tape 38 of plastic material, to the metallized paper tape 45, and to the tape 47 of plastic material) is passed through a separation station S15, in which the silicone-coated support tape 36 is separated from the trimming waste 52 (i.e. the part of the tapes 38, 45 and 47 which has not become part of the closing tabs 21).

Downstream of the separation station S15 a winding station S16 is provided, in which the silicone-coated support tape 36 provided with the closing tabs 21 is wound in the reel 37.

Downstream of the separation station S15, a further winding station S17 is provided, in which the trimming waste 52 is wound in a reel 53 which is intended for recycling.

Between the coupling station S10 and the coupling station S13 a printing station can be provided, in which the tape 38 of plastic material (coupled to the silicone-coated support tape 36 and to the metallized paper tape 45) is passed through a printer that makes prints on the metal part (i.e. on the future metal layer 31).

Between the unwinding station S11 and the coupling station S13 a printing station can be provided, in which the tape 47 of plastic material is passed through a printing device which makes prints on the tape 47 of plastic material (i.e. on the future plastic layer 32).

Between the unwinding station S13 and the trimming station S14 a printing station can be provided, in which the tape 38 of plastic material (coupled to the silicone-coated support tape 36, to the metallized paper tape 45, and to the tape 47 of plastic material) is passed through a printing device which makes prints on the tape 47 of plastic material (i.e. on the future plastic layer 32).

The embodiments described herein can be combined with one another without departing from the scope of the present invention.

The pack 1 of cigarettes described above has numerous advantages.

Firstly, in the pack 1 of cigarettes 1 described above the cigarettes contained in the inner container 14 never come into direct contact with plastic material (also and above all through the extraction opening 20 obtained through the inner container 14), since the inner surface of the closing tab 21 which can touch the cigarettes contained in the inner container 14 always and only directs the paper layer 30 towards the cigarettes (through the through opening 33 made through the plastic layer 29).

Furthermore, the closing tab 21 described above has a uniform thickness having a (small) hole centrally (formed by the through opening 33 made through the plastic layer 29) and this allows to wind the silicone-coated support tape 36 carrying a succession of closing tabs 21 in the reel 37 in a simple and regular way even when the reel 37 has a large diameter, i.e. it is capable of containing many closing tabs 21 so as to not require too frequent replacements; in this regard, we recall that, in the known packaging machines currently on the market, the closing tabs 21 are obtained from a silicone-coated support tape at first, wound to form a reel that cannot be too small to not make the reel changeover operations too frequent. In other words, the closing tab 21 has the advantage of being able to be set up on a reel upon a silicone-coated support tape with substantial tension and geometric regularity due to the very low thickness of the plastic layer 29 (i.e. the innermost layer which has the through opening 33).

Finally, the production plant 35 described above allows the closing tabs 21 described above to be produced effectively and efficiently.

The invention claimed is:

1. A pack (1) for smoking articles comprising:
    a group (26) of smoking articles;
    an inner container (14), which houses the group (26) of smoking articles and is provided with an extraction opening (20) for the smoking articles;
    a closing tab (21), which is coupled to the inner container (14) in the area of the extraction opening (20), so as to close the extraction opening (20), and is provided with a re-stick glue (22) to glue the closing tab (21) to the inner container (14) in a releasable manner;
    a rigid outer container (2) which is cup-shaped and houses the inner container (14); and
    a lid (4), which is cup-shaped and is hinged to the outer container (2) so as to rotate, relative to the outer container (2), between an opening position and a closing position;
    wherein the closing tab (21) comprises a first plastic layer (29), which is placed on an inner side of the closing tab (21) and is directly glued to an outer surface of the inner container (14) by means of the re-sick glue (22);
    wherein the closing tab (21) comprises a paper layer (30) which is arranged in contact with the first plastic layer (29) and on an outer side of the first plastic layer (29) opposite an inner side of the first plastic layer (29) glued to the outer surface of the inner container (14); and
    wherein the first plastic layer (29) has a through opening (33), which is arranged in the area of the extraction opening (20).

2. The pack (1) for smoking articles according to claim 1, wherein the through opening (33) of the first plastic layer (29) has a size that is greater than the size of the extraction opening (20).

3. The pack (1) for smoking articles according to claim 2, wherein the through opening (33) of the first plastic layer (29) is larger than the extraction opening (20) by 1-3 mm per side.

4. The pack (1) for smoking articles according to claim 1, wherein the first plastic layer (29) is glued to the paper layer (30) by means of a non-separable glue.

5. The pack (1) for smoking articles according to claim 1, wherein the closing tab (21) comprises a metal layer (31), which is arranged in contact with the paper layer (30) and more on the outside than the paper layer (30).

6. The pack (1) for smoking articles according to claim 5, wherein the closing tab (21) comprises a second plastic layer (32), which is arranged in contact with the metal layer (31) and more on the outside than the metal layer (32).

7. The pack (1) for smoking articles according to claim 6, wherein the second plastic layer (32) is transparent.

8. The pack (1) for smoking articles according to claim 6, wherein the second plastic layer (32) is glued to the metal layer (31) by means of a non-separable glue.

9. The pack (1) for smoking articles according to claim 6, wherein the second plastic layer (32) is made of polyethylene terephthalate and has a thickness of 25-35 microns.

10. The pack (1) for smoking articles according to claim 1, wherein the paper layer (30) is made of paper having a basis weight of 30-40 grams/m$^2$ and has a thickness of 45-75 microns.

11. The pack (1) for smoking articles according to claim 1, wherein the first plastic layer (29) is made of polypropylene and has a thickness of 10-20 microns.

12. The pack (1) for smoking articles according to claim 1, wherein the closing tab (21) comprises a control flap (23) without the re-stick glue (22).

13. The pack (1) for smoking articles according to claim 12, wherein the closing tab (21) comprises a neutralizing paint (34), which covers the re-stick glue (22) in the area of the control flap (23) so as to make the re-stick glue (22) completely ineffective.

14. The pack (1) for smoking articles according to claim 12, wherein the control flap (23) is glued, in a permanent and non-separable manner, to an inner surface of the front wall (11) of the lid (4).

15. The pack (1) for smoking articles according to claim 1, wherein the group (26) of smoking articles has no inner wrap surrounding the same and is in direct contact with the inner container (14).

16. The pack (1) for smoking articles according to claim 1, wherein:
    a third plastic layer is provided, which is permanently glued to the outer surface of the inner container (14) and around the extraction opening (20);
    the re-stick glue (22) is interposed between the third plastic layer and the first plastic layer (29); and
    at first, the third plastic layer is part of the closing tab (21) in order to be permanently glued to the outer surface of the inner container (14) when the closing tab (21) is applied to the inner container (14).

* * * * *